United States Patent

Rögener

[11] 4,347,957
[45] Sep. 7, 1982

[54] APPARATUS FOR DE-BURRING OF WORKPIECES

[75] Inventor: Peter Rögener, Bad Lauterberg im Harz, Fed. Rep. of Germany

[73] Assignee: Universal Maschinen-u Apparatebau GmbH & Co., KG, Herzberg, Fed. Rep. of Germany

[21] Appl. No.: 145,332

[22] Filed: Apr. 30, 1980

[51] Int. Cl.³ ............................................... B26F 3/00
[52] U.S. Cl. .................................... 225/93; 164/70.1; 225/103
[58] Field of Search ........................... 225/1, 93, 103; 425/806, DIG. 51; 29/415, 424, 426.4, 526.2, 557, 33 A, 33 C; 164/70; 409/297, 301

[56] References Cited

U.S. PATENT DOCUMENTS

| 1,518,283 | 12/1924 | Theberath | 409/297 X |
| 3,112,851 | 12/1963 | Collins | 225/93 X |
| 3,656,671 | 4/1972 | Bratek | 225/93 X |
| 3,903,948 | 9/1975 | Christie | 425/806 X |
| 3,990,825 | 11/1976 | Pasch et al. | 225/93 X |

Primary Examiner—Frank T. Yost
Attorney, Agent, or Firm—Max Fogiel

[57] ABSTRACT

An apparatus for de-burring castings as a rotary workpiece supporting table and, mounted laterally of the same, a freely turnable plate which can be adjusted so that it overlaps the upper surface of the traveling workpieces with close spacing therefrom, so that the plate is impacted by the burrs on the workpieces during the rotation of the workpiece support table, with the result that the burrs are broken off.

7 Claims, 3 Drawing Figures

APPARATUS FOR DE-BURRING OF WORKPIECES

BACKGROUND OF THE INVENTION

The present invention relates to an apparatus for deburring of workpieces, for example to remove the burrs left at the sprue when workpieces are cast.

Burrs of this type form at virtually all cast workpieces and must be removed in order for the workpiece to be smooth, to reduce the possibility of injury and to make the workpieces aesthetically pleasing. Heretofore these burrs have been removed with grinding or cutting wheels, or with hammer and chisel and in similar manner. All of this is, of course, very time consuming and labor-intensive, which ultimately means that it is expensive.

The problem is particularly disadvantageous if workpieces must be de-burred which are produced in large series, i.e. where many identical workpieces are produced and must subsequently have the burrs removed. Nevertheless, despite the fact that the problem has been recognized, no liable alternative to the existing laborious methods has heretofore been proposed.

SUMMARY OF THE INVENTION

Accordingly, it is a general object of this invention to overcome the disadvantages of the prior art.

A more particular object of the invention is to provide an apparatus for de-burring of workpieces which permits the rapid removal of burrs without any need for the use of hand tools.

In keeping with these objects, and with still others which will become apparent hereafter, one aspect of the invention resides in an apparatus for de-burring of workpieces which, briefly stated, may comprise support means for a workpiece to be de-burred; drive means for rotating the support means so that any burr to be removed travels in a predetermined path; and de-burring means stationary relative to the rotating support and extending into the predetermined path of movement of the burrs, so as to be impacted by the traveling burrs and cause them to break off.

It is advantageous if, according to a further concept of the invention, the support for the workpiece is in form of a plate or disk provided with means for holding the workpiece in place, which plate or disk is mounted on a shaft that in turn is journaled in a frame or base where the drive is also provided.

It is important that the apparatus according to the present invention be capable of operating with many different types of workpieces. To make this possible the de-burring means which may be in the form of a plate also, is preferably mounted in a carrier which can be adjusted as to its height, its spacing from the support means and its inclination relative to the axis of rotation of the support means, in accordance with the shape and dimension of the particular workpiece to be processed. The de-burring means is secured on supports, consoles or the like provided on the base or machine frame.

To adjust the carrier for the de-burring means it is advantageous to use readily disengageable socket-type connections between the carrier and the devices mounting it.

The invention will hereafter be described with reference to an exemplary embodiment of the invention as illustrated in the drawing. However, this is for purposes of orientation only and not to be considered limiting to the particular embodiment shown.

DESCRIPTION OF PREFERRED EMBODIMENTS

Figure 1:
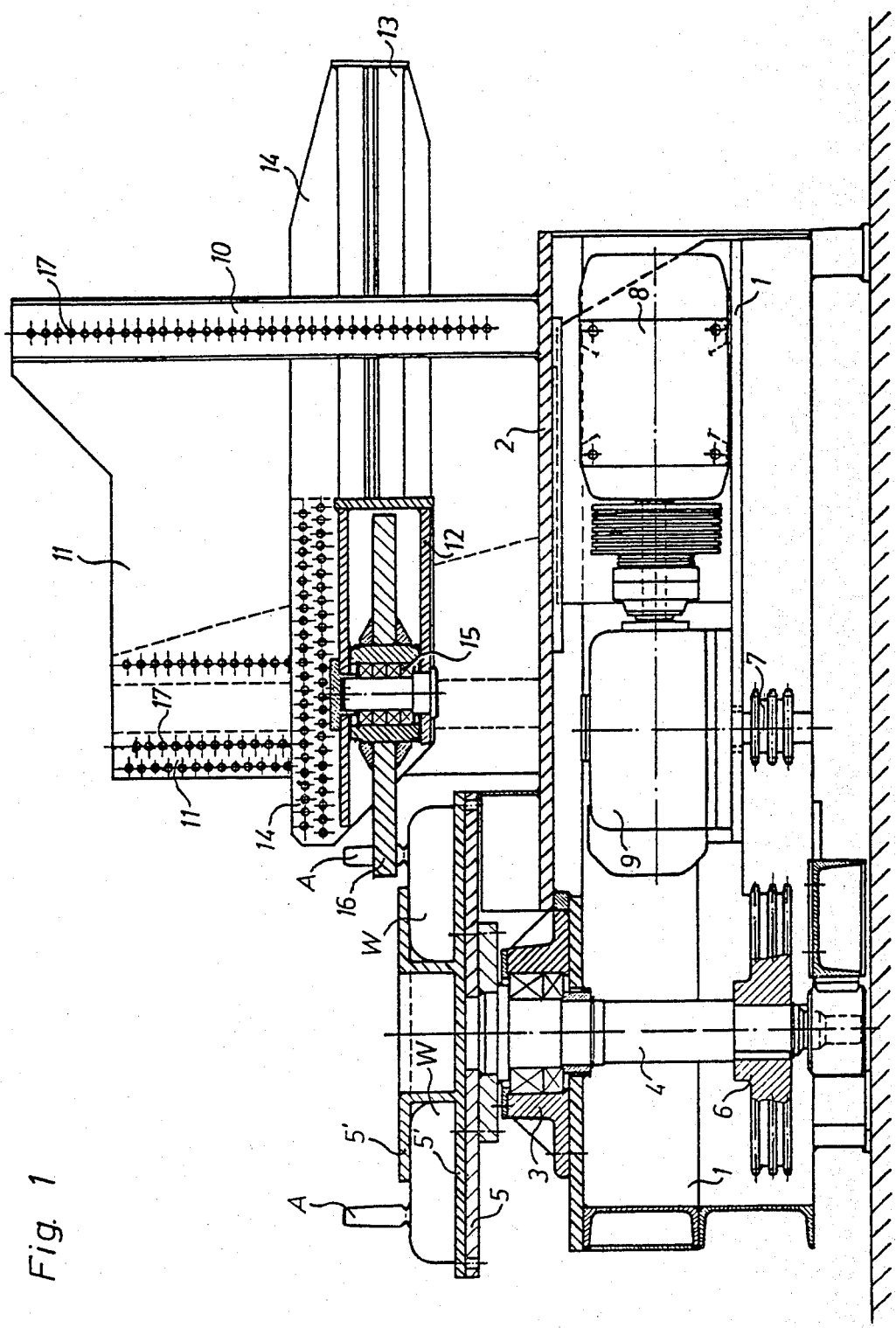
FIG. 1 is a longitudinal section through an apparatus according to the present invention.
Figure 2:
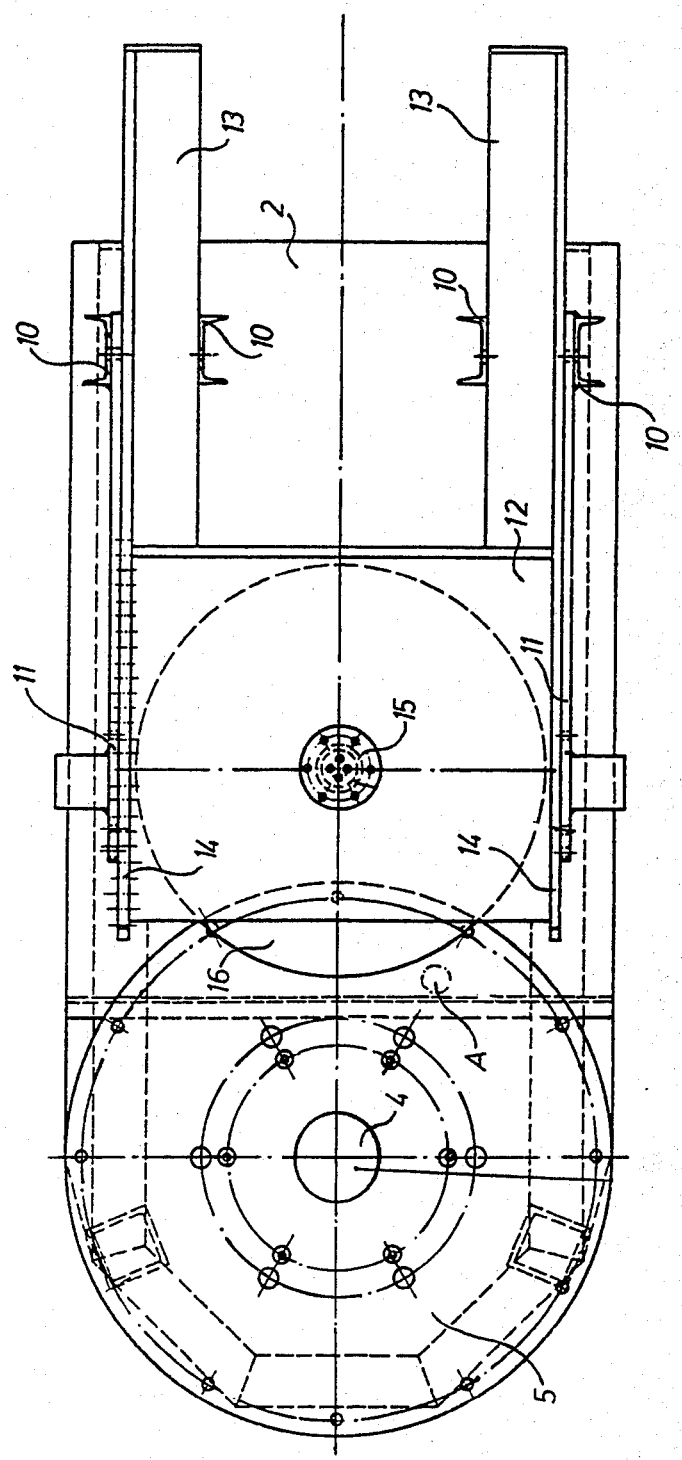
FIG. 2 is a top-plan view of FIG. 1.
Figure 3:
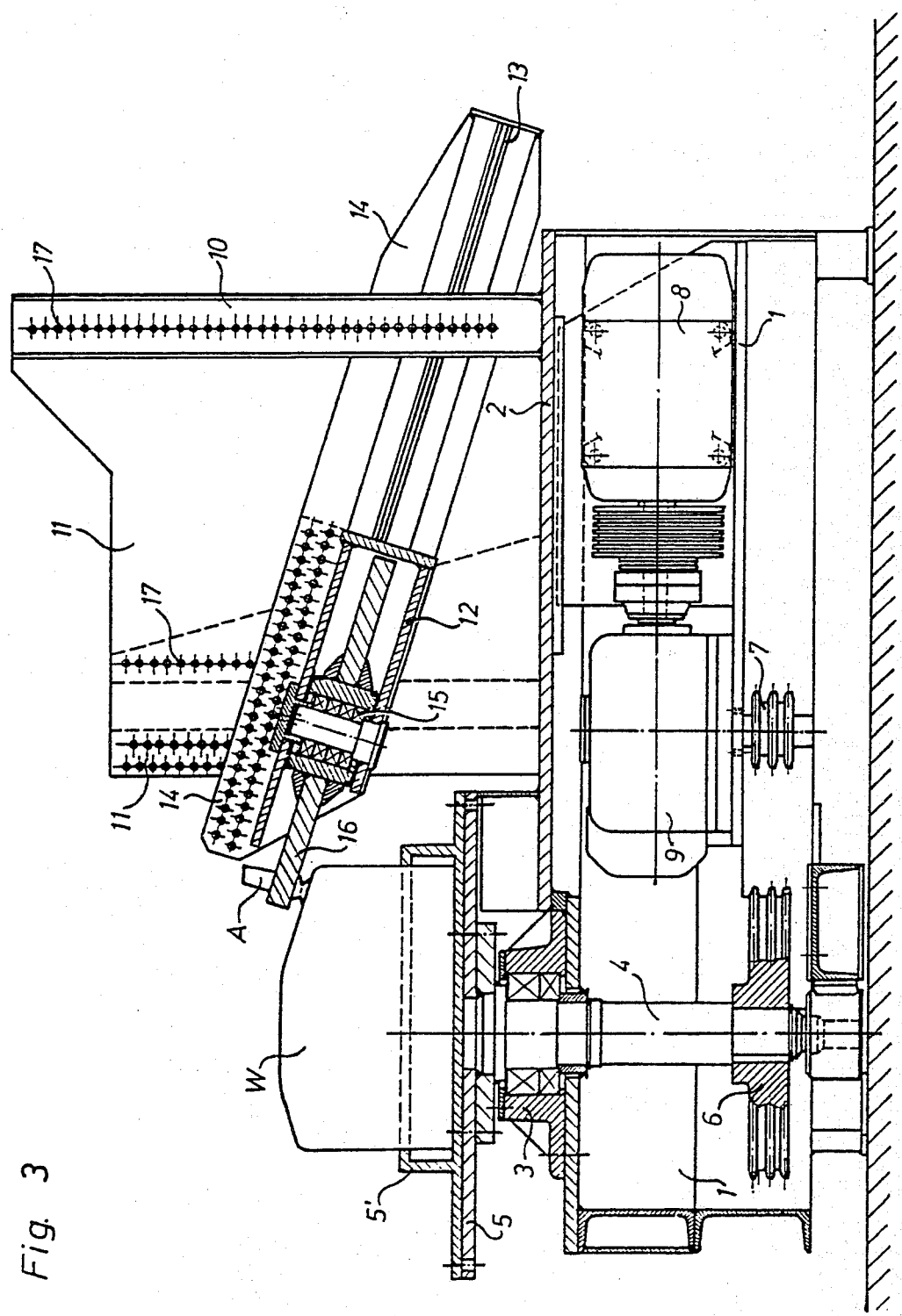
FIG. 3 is a view similar to FIG. 1, but illustrating the components in a different position of adjustment.

An exemplary embodiment of an apparatus according to the present invention is illustrated in FIGS. 1-3. It will be seen that the apparatus has a machine frame or base 1 which may have any desired form, but in the particular illustrated embodiment has approximately the shape of an elongated box. It is covered by a cover plate 2 and at one end is provided with a journal 3 for a vertical shaft 4. The upper end of the shaft 4, which extends upwardly beyond the plate 2 and the journal 3, carries a support plate 5 for a workpiece, for example in form of a work table of circular outline. Mounted on this plate 5 is the actual workpiece supporting plate 5' on which the workpieces W which are to be processed, are mounted. The workpieces (shown in broken lines in FIG. 2) have a burr A which is to be removed. A drive motor 8 with a coupling and a transmission 9 is mounted beneath the plate 2 and rotates the shaft 4 via sprocket wheels 7 and 6 provided respectively on an output shaft of the transmission 9 and on the shaft 4 and connected by a not illustrated drive belt known per se. The speed of rotation of the workpiece support 5' is, of course, adjustable so as to allow for different sizes and dimensions of the workpieces W to be processed. Arrangements for this purpose are known per se and require no detailed discussion; it is merely pointed out that as a rule it will suffice if the table 5' can be made to rotate at two different speeds, i.e. at a higher and a lower number of revolutions per minute.

Vertical supports 10 and a console 11 are provided on the plate 2 and the carrier 12, 13 for the de-burring tool which is here in form of a plate 16, are adjustably connected to the supports 10 and console 11. The plate 16 extends freely beyond the front side of the carriers 12, 13, 14 to a certain extent, so that it can freely project over the upper surface of the workpiece or workpieces W. The plate 16 is freely turnably journaled in a bearing 15 secured in the carriers 12-14.

The supports 10 and consoles 11 and the side walls of the carriers 14, 13 of the carriers are provided with a large number of holes 17. Plugs or members are provided which can be inserted into the holes; these are not illustrated but are perfectly well known per se. Inserting such plug through holes 17 in the supports 10 and consoles 11 on the one hand, and the carrier side walls 14 or the extensions 13 of the de-burring tool 16 on the other hand, permits a rapid connection and an equally rapid disconnection of these components. Since there are many of the holes 17 provided, the carriers 13, 14 can be connected to the supports 10 or console 11 in many different positions, i.e. their height in vertical direction, their location in horizontal direction and their inclination to the vertical and horizontal, can be adjusted within an extremely wide range of possibilities. These adjustments are, of course, always made in such a manner that the freely turnable disk 16 is positioned closely above the upper side of the workpiece W, so that as the workpiece turns on the workpiece support 5' the burr or burrs A abut ultimately against the plate 16 and are broken off by the same. FIG. 3 shows, by way of example, how the arrangement can be adjusted to cooperate with a workpiece having a conical or frusto-conical upper surface on which the burr or burrs A are present.

It will be seen that after proper adjustment of the position of the disk 16 and upon selection of the desired rotational speed of the blade 5', the individual workpieces W can readily be secured on the carrier 5', whereupon the carrier is made to rotate, the burrs A are quickly removed and the workpieces can be replaced with new ones. The apparatus according to the invention is simple and compact and can be readily employed almost everywhere and with almost any type of workpiece.

The invention has hereinbefore been described with reference to an exemplary embodiment described and shown in the drawings. However, this is for information only and the protection sought is to be considered determined exclusively by the appended claims.

What is claimed is:

1. Apparatus for de-burring of workpieces, comprising support means for a workpiece to be de-burred; drive means for rotating said support means so that any burr to be removed travels in a predetermined path; and de-burring means stationary relative to the rotating support and extending into said predetermined path so as to be impacted by the traveling burr and cause the same to break off; said de-burring means comprising a disk and means freely turnably mounting said disk.

2. Apparatus as defined in claim 1, said support means comprising a plate, clamping means on the plate for clamping said workpiece, and a shaft journaling said plate, said drive means being operative for effecting continuous rotation of said plate.

3. Apparatus as defined in claim 1, said de-burring means further comprising a carrier which is adjustable with respect to its height, spacing from said support means and inclination relative to said support means, in dependence upon the shape and size of the workpiece.

4. Apparatus as defined in claim 3, further comprising a base structure on which said carrier is mounted; and quick-coupling means connecting said carrier with said base structure.

5. Apparatus as defined in claim 4, said base structure comprising an elongated table having an upper side at one end portion of which said support means is provided, said carrier being provided on the remainder of said upper side; and said drive means being located beneath a lower side of said table.

6. Apparatus as defined in claim 5, said drive means comprising a motor, a coupling, a transmission and a differential transmission for said element.

7. Apparatus as defined in claim 6, said drive means being speed-adjustable.

* * * * *